Oct. 2, 1928.
S. E. LEONARD, JR
1,685,923
WIRELESS SIGNALING APPARATUS
Filed March 26, 1921
3 Sheets-Sheet 1
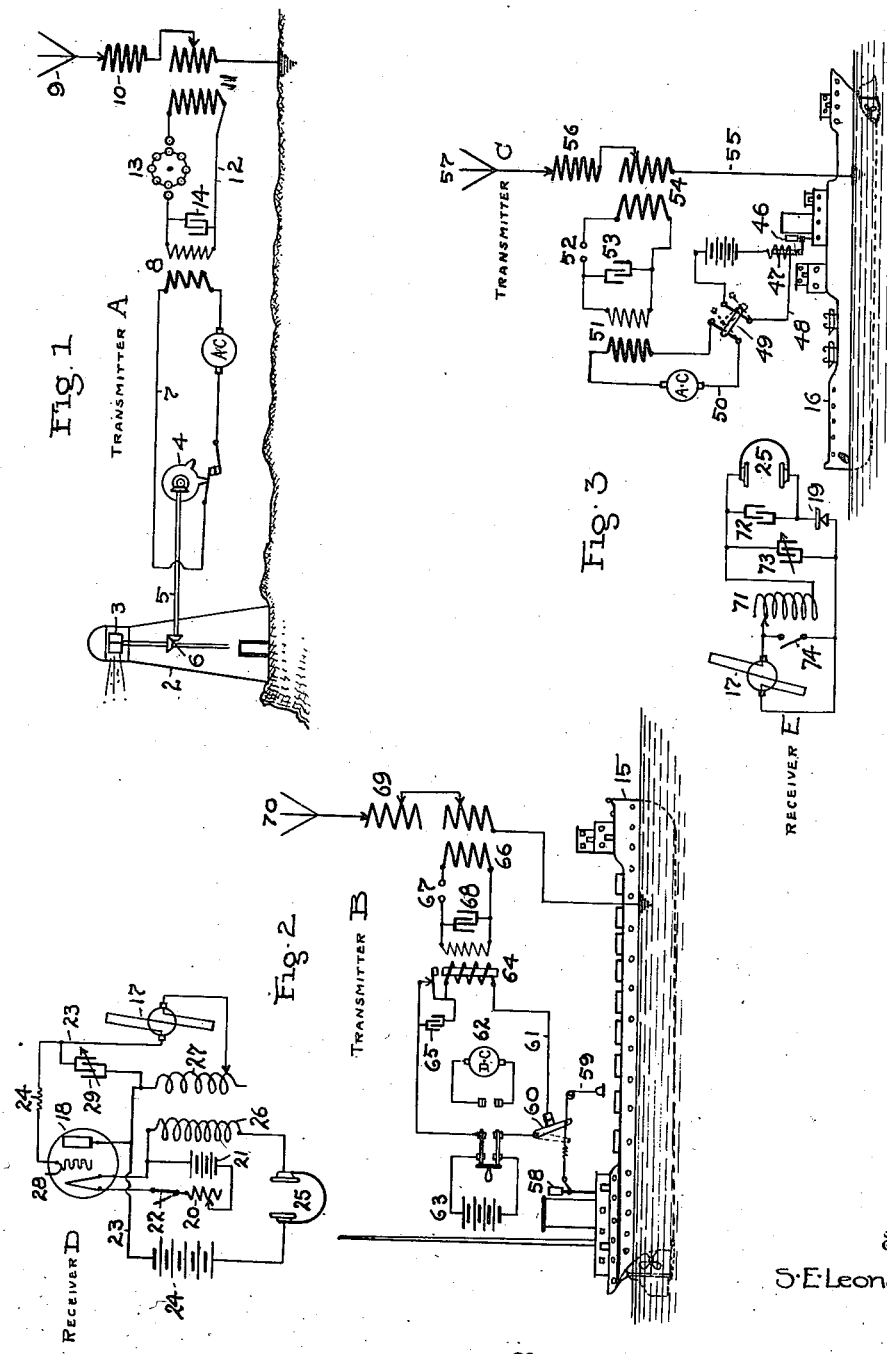
Inventor
S. E. Leonard Jr.
By Fisher & Moser
Attorneys Oct. 2, 1928.  
S. E. LEONARD, JR  
1,685,923  
WIRELESS SIGNALING APPARATUS  
Filed March 26, 1921  
3 Sheets-Sheet 2
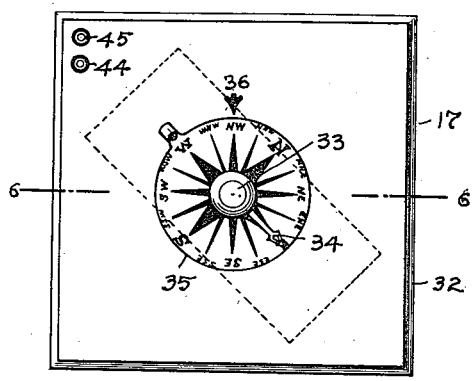
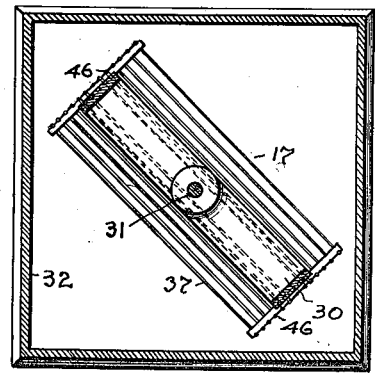
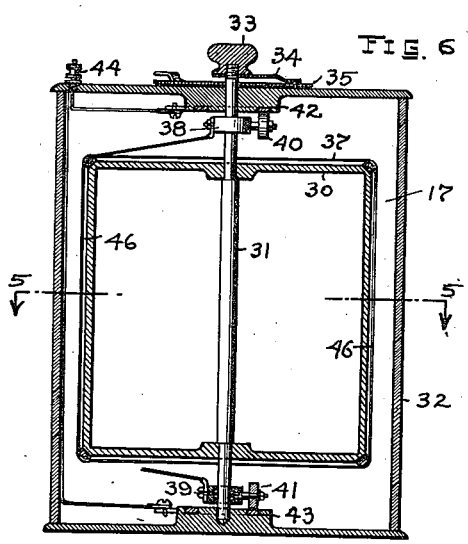
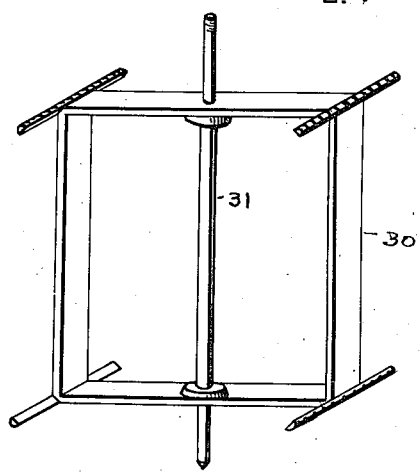
Inventor  
S E Leonard Jr.
By  
Attorneys Oct. 2, 1928.

S. E. LEONARD, JR 1,685,923

WIRELESS SIGNALING APPARATUS

Filed March 26, 1921   3 Sheets-Sheet 3

Inventor
S.E.Leonard Jr.
By Fisher & Moser
Attorneys

Patented Oct. 2, 1928.

1,685,923

UNITED STATES PATENT OFFICE.

SAMUEL E. LEONARD, JR., OF EAST CLEVELAND, OHIO.

WIRELESS SIGNALING APPARATUS.

Application filed March 26, 1921. Serial No. 455,852.

My invention relates to a wireless signaling apparatus which is especially designed for use on ships and as an aid in navigating ships in foggy, smoky or any kind of thick weather where it is impossible to see. Thus, the invention is especially useful to the navigator of one ship in locating other ships, important points or lights, fog signal stations or places on land or shoals; and in locating bearings on points which cannot be seen and determining the distances of the ship from such points. The apparatus is also especially designed to eliminate the need of an experienced wireless operator on the ship and the use of code signals which require an expert to read them. In other words, the apparatus is such that any navigating officer on watch may be able to operate the apparatus without difficulty and obtain bearings on different points and places and objects without aid from others. The apparatus may also be used to particular advantage on ships that ply the Great Lakes as all courses on these inland lakes are pilot courses, and because the ships run close to each other and meet very thick weather conditions, smoke, etc. At present most of the Great Lakes steamers, especially the freight steamers, have no wireless installations of any sort because of the expense and the necessity of maintaining an expert to operate the ordinary wireless outfits.

Figure 8:
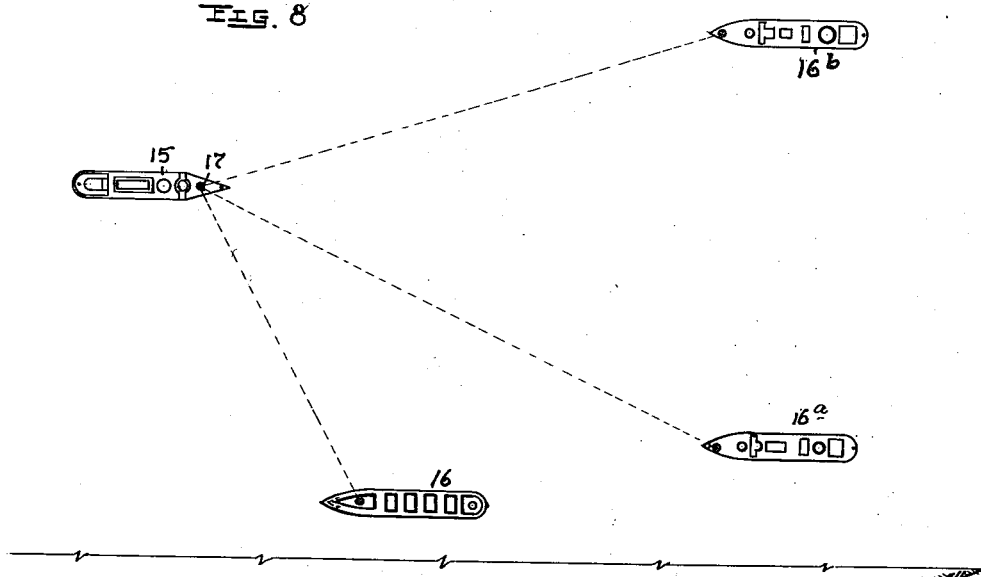
Figure 9:
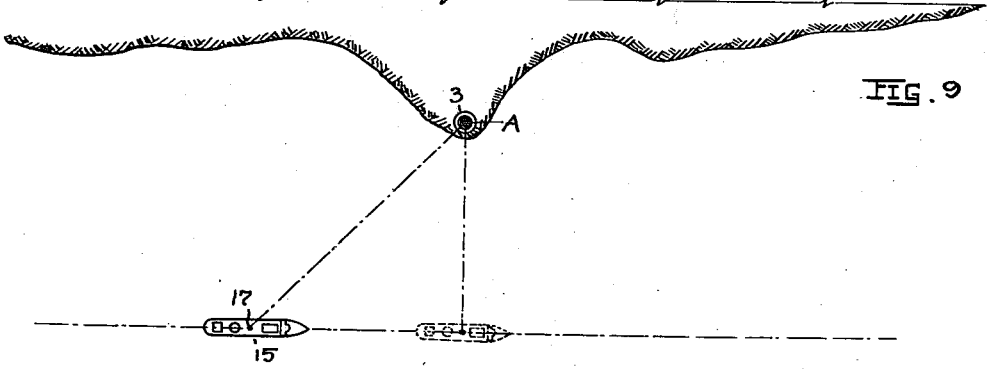
Figure 10:
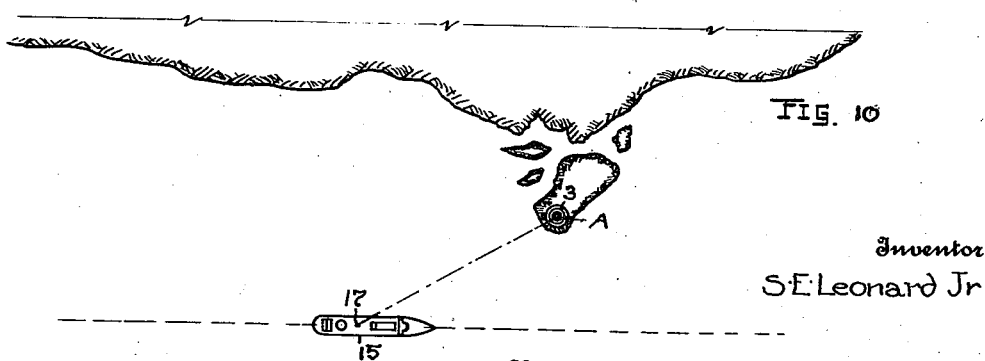

In the accompanying drawings, Fig. 1 is a diagrammatic view of a land installation, and Figs. 2 and 3 are diagrammatic views of two ship installations involving my invention, the three figures being grouped on one sheet to show a working arrangement whereby either ship may locate its bearings in respect to the land or other ship. Figs. 4, 5, 6 and 7 are different views of a direction finding device which is placed in the receiving circuit on each ship, Fig. 4 being a plan or top view of the direction finder, Fig. 5 a horizontal cross section on line 5—5 of Fig. 6, Fig. 6 a vertical view on line 6—6 of Fig. 4, and Fig. 7 a perspective view of the rotatable loop aerial frame. Fig. 8 is a diagram showing one ship meeting three others, the dotted lines representing the angles at which the direction finders would be placed in signaling operations. Fig. 9 is a diagram of a ship in full and dotted lines fixing its course and distance from a fixed point or light on shore. Fig. 10 is a diagrammatic view showing a ship close to the shore which is hidden by thick weather but determining its course by the direction finder.

The invention involves the use of wireless transmitting apparatus located on the land and on ships, and the land apparatus is adapted to transmit waves of a predetermined length automatically at periodical intervals, while each ship transmitter is only designed to transmit waves synchronously with a warning signal such as the blowing of a steam whistle on the ship. A wireless receiving apparatus is also placed on each ship in which a direction finder is used to pick up and locate the waves from the transmitter or any number of transmitters within a given radius of operation.

The land transmitter is illustrated in Fig. 1, which shows a light house 2 having a rotatable light 3 operated by any of the various means in general use and which light it should be understood is timed to rotate and flash at fixed intervals. Associated with this light operating mechanism, is a rotatable contact device 4 driven by a countershaft 5 and beveled gearing 6, whereby the primary circuit 7 of a transformer 8 is opened and closed at regular intervals as the contact disk 4 revolves and successive pure sharp waves of given length will be emitted from aerial 9. This aerial 9 is connected with a tuning inductance 10 and to the ground through an oscillation transformer 11 by a circuit 12 which includes a non-synchronous rotary spark gap 13 and a transmitting condenser 14 substantially as shown in diagram, Fig. 1. In operation, as light 3 revolves the contact disk 4 also revolves in time therewith and produces a predetermined number of wireless waves at fixed intervals. These wireless signals correspond to the light signal or are characteristic of the light signal. However, such a transmitter may be installed and operated independently of a light, and the thought is to place such transmitters on shore or on shoals wherever needed and operate the same constantly so that ships off these points may pick up the waves with a receiving apparatus on board and fix the ship's bearing and location offshore at any time and under any condition, but especially when the weather is such that the shore or light cannot be seen.

The receivers are placed aboard the ships, and in Figs. 2 and 3 I show two ships 15 and 16 equipped with receivers comprising identical loop or direction finding aerials 17, but the receiver circuits for the two ships differ somewhat in that receiver D is equipped with an audion detector 18, and receiver E is equipped with a crystal detector 19. This showing of two different receivers illustrates the applicability of different receiver circuits in which similar direction finders or loop aerials 17 may be utilized to aid a navigator in determining his bearings and course. The circuits may be identical but referring first to receiver circuit D, this circuit comprises an audion detector 18, the filament of which is connected to a resistance 20, a battery 21, and a switch 22. Receiver D also comprises a circuit 23 which includes a battery 24, head phones or receivers 25, a tickler coil 27, a fixed inductance 26, and a loop aerial or direction finder 17 connected with the grid 28 of the audion detector 18. A variable condenser 29 is also connected across the line in circuit 23 and a grid break 24 is placed between the loop aerial 17 and grid 28.

The direction finder or loop aerial 17 comprises a skeleton frame 30 of rectangular shape supported by a central vertical shaft 31 which is adapted to be rotated in suitable bearings at the top and bottom of a wooden casing 32, the upper end of shaft 31 extending through the top side of the casing where a handle 33 may be engaged to rotate the shaft and frame 30. A pointer 34 is also affixed to the shaft or handle opposite an adjustable compass card 35 which rests in an independently rotatable position upon the top face of casing 32, and an arrow-head 36 opposite the edge of the compass card marks the ship's head. The compass card is calibrated to points and degrees according to accepted standards and the card is rotated and set to denote the ship's course before taking a wireless reading. The loop aerial or coil 17 comprises a wire 37 which is wound around rectangular frame 30 to provide a plural number of rectangular loops or windings, one end of the wire being fastened to a collar 38 at the upper end of shaft 31 and the other end of the wire being secured to a collar 39 at the lower end of the shaft. Rollers 40 and 41 on the collars contact with fixed rings 42 and 43 mounted upon casing 32 and these rings are connected by wires to a pair of terminals 44 and 45, respectively, at the top of the casing. The vertical portions 46 of the wire coil or winding on frame 30 are parallel with the axis and lie in a flat vertical plane at right angles to the open sides of the frame and the loops, and each turn of wire is spaced slightly apart from the next or adjacent turn. The maximum lines of force are cut by the incoming waves when the full width of windings 46 are placed exactly at right angles to a straight line extending to the source of the incoming waves, or in other words directly across the path and squared to the course of the incoming waves as represented by a straight line extending to the source or point from which the wave is radiated or emitted. When the open side of frame 30 is squared with the incoming wireless wave, the plane of each loop or winding is parallel to the wave and no lines of force are cut, and therefore no induction is set up in the windings or coil. On the other hand, as the frame and coil are turned around the vertical axis 31 to square the flat face of the winding to the incoming wave an increasing number of lines of force are cut from minimum to maximum, the maximum induction being set up when the narrow sides of the frame are squared or at right angles to the incoming wave. In this way, weaker or stronger currents are induced in circuit 23 depending upon the angular position of frame 30 and the loops in respect to the incoming Hertzian wave, and the operator is enabled to detect the maximum operating efficiency of the direction finder by the intensity of the sound at head phone 25. The pointer 34 then permits a reading in degrees on the compass card from the ship's course as marked by arrow 36, and the ship's course and the direct line to the transmitter as indicated by the pointer provides two legs of a triangle to determine the position of the ship in respect to the transmitter. This is exemplified in diagram Fig. 10 in locating the position of a ship in respect to a point on land, the diagram showing a shore line with transmitter A located in a lighthouse 3 on a shoal or island off-shore, with a ship steering 360° and with the shoal or light lying approximately 30° off the port bow of the ship. Assuming that thick weather prevails and the navigator is unable to see the light, he may still determine his position and arrange his course by turning the direction finder until the maximum operating position of the finder is detected by the head phone and his bearing in degrees in respect to the shoal or light is accurately determined on the compass card. Then, as the ship proceeds on its course—a pilot course— he can maintain a continuous bearing on the light or point by means of the direction finder, and if he desires he can also locate the distance of his ship off-shore. This is illustrated diagrammatically in Fig. 9 where the direction finder on the ship in full lines has located and is pointing at light 3 at an angle of 45° to the ship's course, and where the ship in dotted lines represents a second reading when the ship has traveled a predetermined distance and the direction finder has pointed off a difference of 90° from the former reading, which indicates or establishes that the ship is the same distance from the light as the distance traveled by the ship from the first reading. The hypothenuse of the triangle is determined by the direction finder, the course of the ship represents the base of the triangle, and a 90° reading determines the perpendicular of the right-angled triangle. When the second reading determines the exact perpendicular the exact distance of the ship from the shore becomes known because it must be equal to the distance traveled by the ship from the place of the first reading.

Having described the mode of operation of the direction finder with a transmitter on land, I will now illustrate its application to a transmitter on a ship, whereby one ship may locate another ship within the range of the finder, and to avoid repetition I shall simply refer to receiver D on ship 15 in Fig. 2, and state that ship 16 in Fig. 3, is equipped with a Hertzian wave transmitter C tuned to a given wave length of less power than the land transmitters. This ship transmitter is not designed to operate continuously, but is particularly arranged to emit waves in synchronism with the usual warning signals prescribed by Government codes and regulations under certain conditions, such for example, as the blowing of a whistle a predetermined number of times at intervals in thick or foggy weather. Such whistles are operated either manually or automatically, and in Fig. 3, I show a steam whistle 46 which is electrically operated by a magnetic switch 47 in a circuit 48 controlled by a double pole switch 49 which when opened and closed to blow the whistle concurrently opens and closes the generator circuit 50 for transmitter C. The transmitter circuit comprises a transformer 51, a spark gap 52, a condenser 53, an oscillation transformer 54 having a ground connection 55, and a tuning inductance 56 adapted to produce a sharp wave of given length at aerial 57.

Now assuming that ships 15 and 16 are approaching each other, the navigator of ship 15 is enabled to locate ship 16 by rotating the direction finder 17 in circuit 23 during the interval of the blowing of whistle 46 on ship 16 inasmuch as transmitter C is sending waves in synchronism with the blowing of the whistle. The officer on watch on ship 15 is aware of the presence of the approaching ship, providing said ship is in sound carrying range, but in thick or foggy weather it is frequently difficult to determine just how the approaching ship bears, but by using the phone 25 and revolving the direction finder 17 until the maximum wireless signal is obtained, the operator may point finger 34 of the direction finder directly towards the oncoming vessel and adjust his course accordingly.

Where both ships are equipped with receivers and transmitters the navigator of each ship may assure himself of the exact position of the other ship and the direction taken by each by similar readings and by repeating such readings as the ships approach each other, and in Figs. 2 and 3 I show a transmitter and receiver on each ship. Similar receivers and similar transmitters may be used on these ships, but they may also differ somewhat and still operate effectively with each other. To illustrate this, I show a modified circuit and transmitter on ship 15, and a slightly modified form of receiver E on ship 16. Thus, referring to Fig. 2, the steam whistle 58 on vessel 15 is operated manually by a flexible cable 59 which is connected with an electric switch 60 so that the main circuit 61 of transmitter B may be closed simultaneously with the blowing of the whistle and for the same period of time. Electric current may be derived from either a direct current generator 62 or batteries 63, and an induction coil 64 and condenser 65 is included in this circuit. The secondary winding of the induction coil is connected to oscillation transformer 66, and a spark gap 67 and a condenser 68 are included in the secondary circuit. One winding of oscillation transformer 66 is grounded and associated with a tuning inductance 69 and an aerial 70 from which the wireless waves emitted are tuned to a pure sharp wave of given length.

Receiver E on vessel 16 differs from receiver D on vessel 15 in that it is equipped with a crystal detector 19 instead of an audion detector, and the circuit is modified accordingly, the diagram showing a fixed inductance 71, head phone 25, a fixed condenser 72, a variable condenser 73, and a switch 74 to cut off the direction finder 17.

To further illustrate the applicability and utility of the invention I show in Fig. 8 three vessels 16, 16$^a$ and 16$^b$ bound in the same direction and a fourth vessel 15 bound in an opposite direction, all equipped with receivers and transmitters. Assuming that the weather is such that the regulations demand the blowing of warning whistles, the navigating officer in each ship is enabled to locate all of the other ships within range of his particular receiver, but as delineated the position of only a single approaching vessel is shown, the dotted lines representing the bearings in degrees relatively to the ship's head. Having in mind that the warning whistles are being sounded at regular intervals, the navigator would in the natural course of things revolve the direction finder to locate the nearest ship which in the present instance is ship 16 and obtain his bearings and direct his course according to the compass card reading on the direction finder. He would then repeat this operation with the other two ships off port and starboard and he would be assisted in doing so by the blasts of the whistle given synchronously with the wireless waves emitted from the transmitters of these two ships. In this connection, it must be understood that the blowing of the whistles on the various ships occur at different intervals, thereby giving the navigators on the ships ample opportunity to obtain the correct bearing on ship because the direction finder will assist him in getting a direct line on any particular ship simultaneously with the blowing of its whistle.

What I claim is:

A wireless directional determining apparatus for use on ships, comprising a loop aerial adapted to be rotated manually, a compass card located upon the same axis as said loop aerial and means for rotating the compass card manually independently of said loop aerial and other points, and a calibration point moving into exact alignment with the ship's head or a point homologous to the ship's head to serve as a reference point with respect to said compass card.

Signed at Cleveland, in the county of Cuyahoga and State of Ohio, this 9th day of March, 1921.

SAMUEL E. LEONARD, Jr.